US010853218B1

(12) United States Patent
Beaman et al.

(10) Patent No.: US 10,853,218 B1
(45) Date of Patent: Dec. 1, 2020

(54) RECORDING AND PLAYBACK OF A WEB BROWSER SESSION

(71) Applicant: SHUTTERSTOCK, INC., New York, NY (US)

(72) Inventors: Roger Wilbur Beaman, New York, NY (US); Rachel Judith Hazes, Brooklyn, NY (US); John Holmes Dean, III, Houston, TX (US)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 16/221,876

(22) Filed: Dec. 17, 2018

(51) Int. Cl.
*G06F 3/0481* (2013.01)
*G06F 11/34* (2006.01)
*G06F 11/36* (2006.01)

(52) U.S. Cl.
CPC ...... *G06F 11/3414* (2013.01); *G06F 11/3419* (2013.01); *G06F 11/3438* (2013.01); *G06F 11/3688* (2013.01)

(58) Field of Classification Search
CPC .......... G06F 3/023; G06F 3/0481; G06F 3/00; G06F 11/3476; G06F 9/45512
See application file for complete search history.

(56) References Cited

U.S. PATENT DOCUMENTS

| | | | | |
|---|---|---|---|---|
| 8,549,476 B2* | 10/2013 | Shufer | | G06F 11/3692 714/38.1 |
| 8,862,118 B2* | 10/2014 | Whidden | | H04M 1/24 455/420 |
| 8,869,174 B2* | 10/2014 | Wong | | G06F 11/3476 382/128 |
| 9,588,879 B2* | 3/2017 | Horovitz | | G06F 11/3688 |
| 10,386,985 B2* | 8/2019 | Ciano | | G06F 3/0481 |
| 10,530,835 B2* | 1/2020 | Nitsan | | G06F 9/44526 |
| 2005/0278728 A1* | 12/2005 | Klementiev | | G06F 9/45512 719/328 |
| 2006/0005132 A1* | 1/2006 | Herdeg, III | | G06F 9/45512 715/704 |
| 2007/0261097 A1* | 11/2007 | Siegman | | G06F 3/023 725/134 |
| 2009/0222727 A1* | 9/2009 | George | | G06F 16/95 715/704 |
| 2011/0191676 A1* | 8/2011 | Guttman | | G06F 3/00 715/716 |

(Continued)

*Primary Examiner* — Rashawn N Tillery
(74) *Attorney, Agent, or Firm* — McDermott, Will & Emery LLP

(57) ABSTRACT

A method including capturing a document object model event from a user accessing a document in an application is provided. The method includes identifying a window for the application in a display, identifying a relative position of a cursor from the user within the window, and detecting a resolution for the display within the window. The method also includes inserting a time-stamp for the document object model event and adding the document object model event, the relative position of the cursor, the resolution for the display, and the time-stamp in a playback code. The method also includes playing back the document object model event in a sequence according to the time-stamp, the relative position of the cursor, and the resolution for the display, in a second display. A system and a non-transitory, computer-readable medium to perform the above method are also provided.

17 Claims, 8 Drawing Sheets

(56) References Cited

U.S. PATENT DOCUMENTS

| | | | |
|---|---|---|---|
| 2014/0075563 A1* | 3/2014 | Simpson | G06F 21/577 726/25 |
| 2016/0165289 A1* | 6/2016 | McClanahan | G06F 16/285 725/14 |

* cited by examiner

RECORDING AND PLAYBACK OF A WEB BROWSER SESSION

BACKGROUND

Field

The present disclosure generally relates to recording and playback of a user interaction with a network application. More specifically, the present disclosure relates to methods and systems for recording user actions during a session accessing a webpage with a network browser, and for playing back the session at a selected cadence.

Description of the Related Art

Conventional techniques (e.g., javascript and the like) for simulating user events are typically used for automated testing of certain web browsing applications. Certain user event recording and playback tools exist, such as hypertext markup language (HTML) based scripts. However, these applications are typically built over a debug/remote connection like "selenium" or chrome remote-desktop (RDP) application that couples to the browser at a very low level. These tools require additional extensions and/or debug connections installed into the browser selected for recording or control. Accordingly, these solutions are inappropriate for web pages targeting end-users running standard browsers.

SUMMARY

In one embodiment of the present disclosure, a computer-implemented method is described for capturing a document object model event from a user accessing a document in an application is provided. The computer-implemented method includes identifying a window for the application in a display, identifying a relative position of a cursor from the user within the window, and detecting a resolution for the display within the window. The computer-implemented method also includes inserting a time-stamp for the document object model event and adding the document object model event, the relative position of the cursor, the resolution for the display, and the time-stamp in a playback code. The computer-implemented method also includes playing back the document object model event in a sequence according to the time-stamp, the relative position of the cursor, and the resolution for the display, in a second display.

According to one embodiment, a system is described that includes one or more processors and a memory coupled to the one or more processors, the memory including instructions that, when executed by the one or more processors, cause the system to capture a document object model event from a user accessing a document in an application. The one or more processors also execute instructions to identify a window for the application in a display, to identify a relative position of a cursor from the user within the window, and to detect a resolution for the display within the window. The one or more processors also execute instructions to insert a time-stamp for the document object model event, to include the document object model event, the relative position of the cursor, the resolution for the display, and the time-stamp in a playback code, and to play back the document object model event in a sequence according to the time-stamp, the relative position of the cursor, and the resolution for the display, in a second display.

According to one embodiment, a non-transitory, machine-readable medium is described that includes instructions, which when executed by one or more processors, cause a computer to perform a method for capturing a document object model event from a user accessing a document in an application is provided. The method includes identifying a window for the application in a display, identifying a relative position of a cursor from the user within the window, and detecting a resolution for the display within the window. The method also includes inserting a time-stamp for the document object model event and adding the document object model event, the relative position of the cursor, the resolution for the display, and the time-stamp in a playback code. The method also includes playing back the document object model event in a sequence according to the time-stamp, the relative position of the cursor, and the resolution for the display, in a second display.

In yet other embodiment, a system is described that includes a means for storing commands and a means for executing the commands causing the system to perform a method that includes capturing a document object model event from a user accessing a document in an application is provided. The method includes identifying a window for the application in a display, identifying a relative position of a cursor from the user within the window, and detecting a resolution for the display within the window. The method also includes inserting a time-stamp for the document object model event and adding the document object model event, the relative position of the cursor, the resolution for the display, and the time-stamp in a playback code. The method also includes playing back the document object model event in a sequence according to the time-stamp, the relative position of the cursor, and the resolution for the display, in a second display.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file.

The present disclosure relates to recording and playback of a user interaction with a network application. More specifically, the present disclosure relates to methods and systems for recording user actions during a session accessing a webpage with a network browser, and for playing back the session at a selected cadence.

Some embodiments include software that attaches to an HTML page and, when notified, is able to record user actions on a webpage by capturing HTML document object model (DOM) events, as they occur.

Some implementations provide a front-end portal that users can access remotely using a mobile device or a workstation. Recording and playback technology as disclosed herein obviates the use of extensions or any external hooks into a web browser. Accordingly, tools consistent with the present disclosure may be deployed on any webpage on a compatible browser. User actions can be recorded, stored, and played back at a future time, with no additional browser tooling.

Embodiments as disclosed herein provide a solution to the problem arising in the realm of computer technology, of using playback of web browsing sessions for training, debugging, and testing of a web portal. To achieve this, some embodiments include a node path that a web browser may retrace to reproduce all, or almost all, of the events in a web browsing session.

The subject system provides several advantages, including a feature for including time-stamps of each of the web browsing events and the generation of synthetic events interpolating real-time events, to create a seamless reproduction of a web browsing session.

The proposed solution further provides improvements to the functioning of the computer itself because it reduces the burden of storing images of webpages and redux states in a web browser, while still providing an accurate and seamless rendition of the web browsing session.

Example System Architecture

Figure 1:
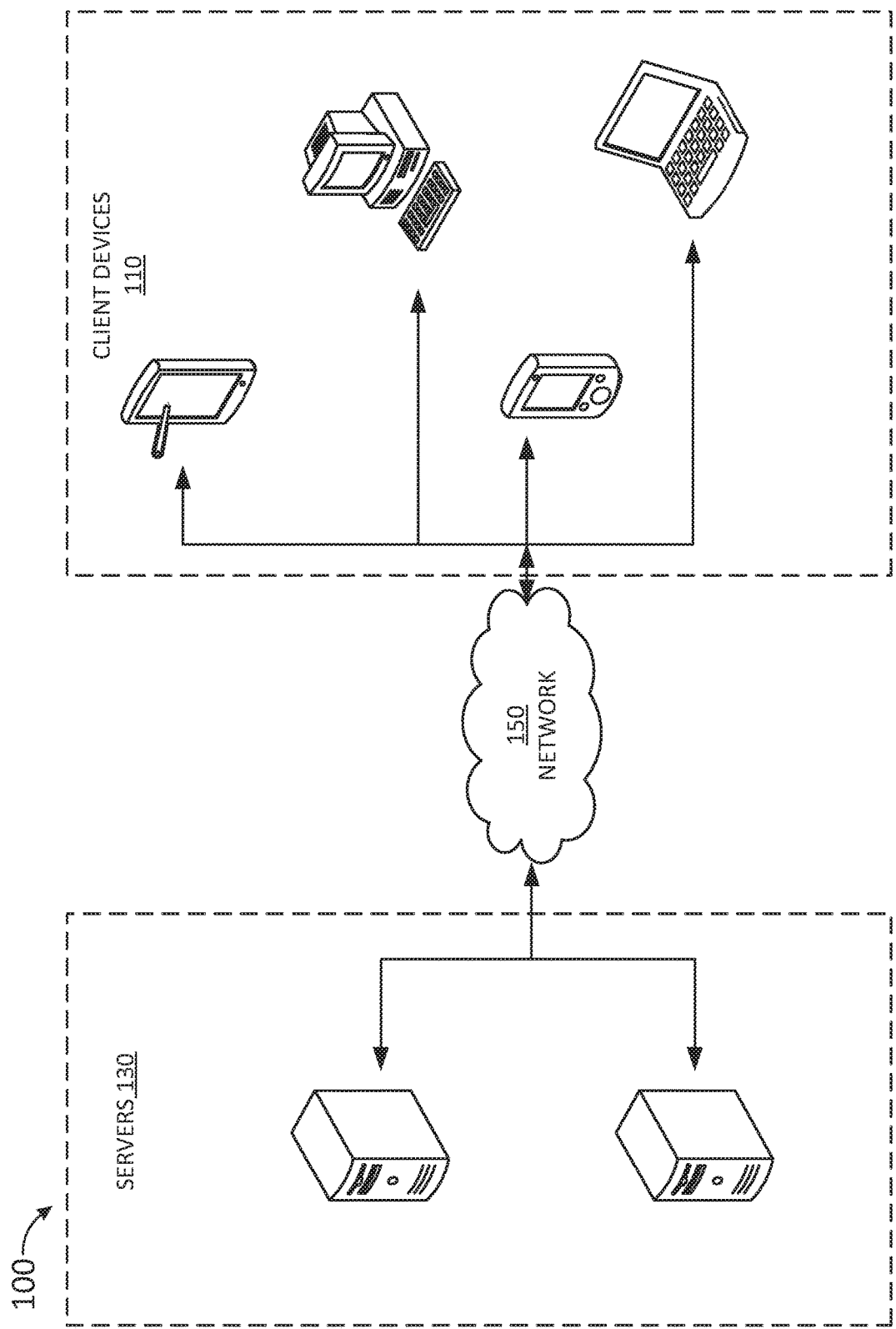
FIG. 1 illustrates an example architecture suitable for recording a web browser session, according to some embodiments.

FIG. 1 illustrates an example architecture 100 for a web browsing engine suitable for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to record a web browsing session of the user of one of client devices 110. Further, in some embodiments, the processor is configured to replay a recorded web browsing session of the user of one of client devices 110. Accordingly, the processor may use a synthetic cascading style sheet (CSS) tool to generate interpolated synthetic CSS hover effect, and a synthetic event tool to generate a seamless reproduction of a web browsing session for the user of one of client devices 110. For purposes of load balancing, multiple servers 130 can host memories including instructions to one or more processors, and multiple servers 130 can host a history log and the second image database.

Servers 130 may include any device having an appropriate processor, memory, and communications capability for hosting a playback tool and a browser engine including the tool. The browser engine may be installed in various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine and the history log on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
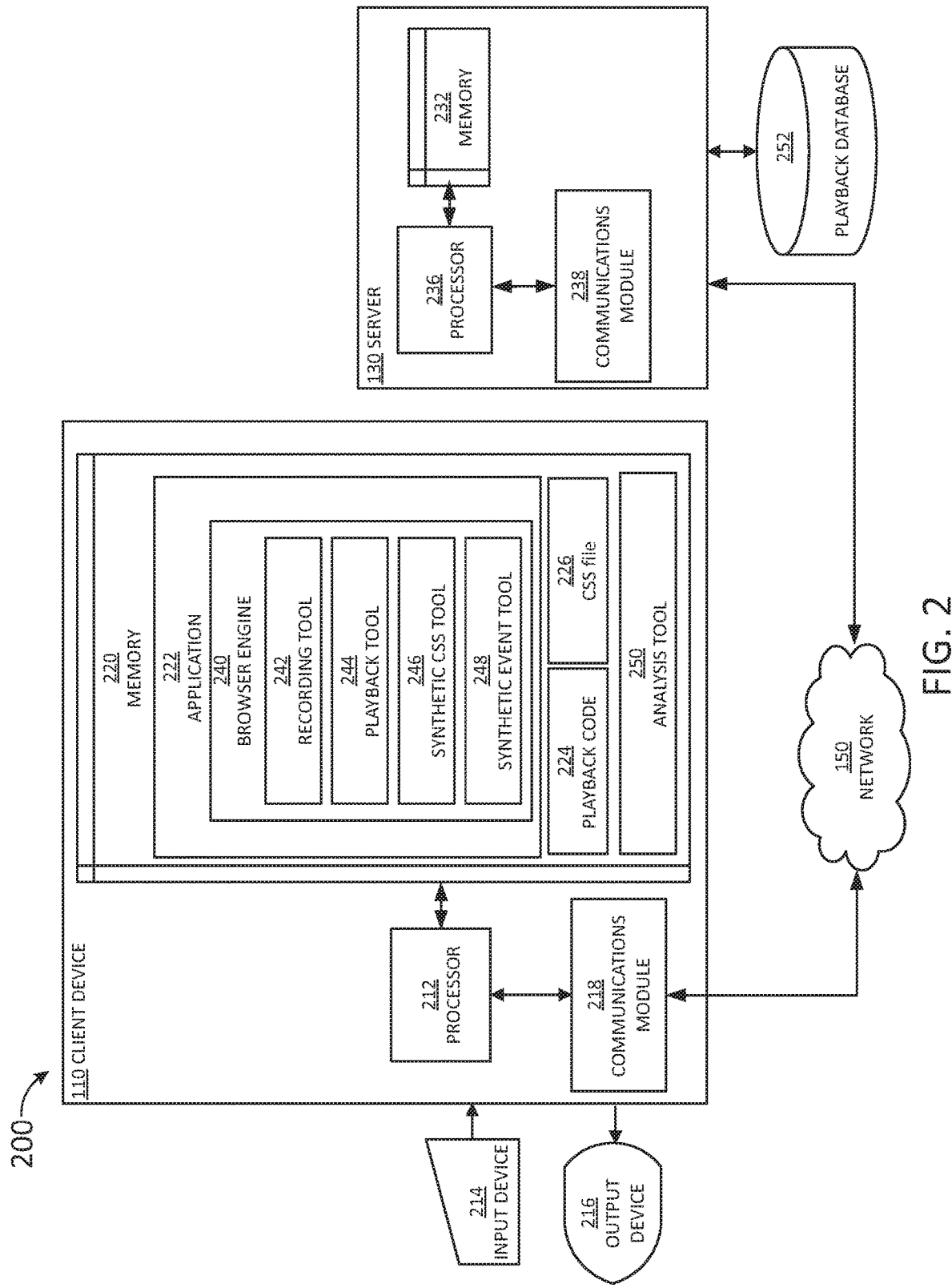
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards. A user may interact with client device 110 via an input device 214 and an output device 216. Input device 214 may include a mouse, a keyboard, a pointer, a touchscreen, a microphone, and the like. Output device 216 may be a screen display, a touchscreen, a speaker, and the like.

Server 130 includes a memory 232, a processor 236, and a communications module 238. Processor 236 is configured to execute instructions, such as instructions physically coded into processor 236, instructions received from software in memory 232, or a combination of both.

Client device 110 includes a memory 220 and a processor 212. Memory 220 stores instructions which, when executed by processor 212, cause client device 110 to perform, at least partially, steps in methods consistent with the present disclosure. For example, memory 220 ma include an application 222 for a browser engine 240. The user may access browser engine 240 through an application 222 or a web browser installed in memory 220. Accordingly, application 222 may be installed by server 130 and perform scripts and other routines provided by server 130. Execution of application 222 may be controlled by processor 212 in client device 110. In some embodiments, the user may install application 222 in client device 110 by accessing server 130 through network 150 with communications module 218.

In some embodiments, memory 232 includes a browser engine 240. Browser engine 240 may include a recording tool 242, a playback tool 244, a synthetic CSS tool 246, and a synthetic event tool 248. Recording tool 242 is configured to capture events in a web browsing session of a user with client device 110, and store them in a playback code 224. Playback code 224 may be stored in a memory 220 of client device 110. A CSS file 226 in memory 220 may include hover effects associated with an input device 216 (e.g., a mouse, a floating cursor or pointer, and the like) recorded for the web browsing session of the user. In some embodiments, recording tool 242 cooperates with playback tool 244 to form a node path which, when executed by an application 222 hosted by browser engine 240, reproduces a web browsing session of a user of client device 110.

Synthetic CSS tool 246 is configured to generate a plausible (e.g., 'realistic'), synthetic CSS hover effect for playback code 224. Synthetic event tool 248 is configured to create events in a node path for playback code 224 to create a seamless reproduction of a web browsing session of the user of client device 110. An analysis tool 250 in server 130 may provide analysis of playbacks for user interactions with application 222 for one or more users. Accordingly, in some embodiments analysis tool 250 may modify features of application 222 to improve a user interface in client device 110. In some embodiments, analysis tool 250 is configured to perform post processing of playback code 224. For example, in some embodiments analysis tool 250 may clean up the recording, add annotations to the mouse cursor, and replace portions of playback code 224 with scripted events.

In some embodiments, synthetic event tool 248 is configured to access playback database 252 for training, and synthetic CSS tool 246 is configured to provide CSS file 226 to playback database 252. In some embodiments, CSS file 226 may include a Java Script Object Notation (JSON) payload that is transmitted to server 130, which stores it in playback database 252.

In some embodiments, a playback code 224 includes a whitelist of DOM events. Accordingly, when a playback of a web browsing session is enabled in application 222, the whitelist in playback code 224 is listened to on a root HTML document of the webpage for application 222. In some embodiments, playback code 224 includes an entire redux app state (e.g., in react-redux applications). CSS file 226 includes hover effects over a display provided by application 222, associated with a cursor (e.g., input device 214). Accordingly, in some embodiments all components of the web browser recording application are included in browser engine 240, within memory 220.

In some embodiments, playback code 224 may be generated while executing application 222, when a recording request has been entered by the user in client device 110. As the user performs actions on a web page, listeners set up in application 222 receive DOM events generated by the browser (e.g., application 222) in response to user actions, and populate playback code 224. In some embodiments, playback code 224 is executed by processor 212 during playback (when playback is enabled in client device 110, e.g., by the user) to create a known starting state for the playback.

Figure 3:
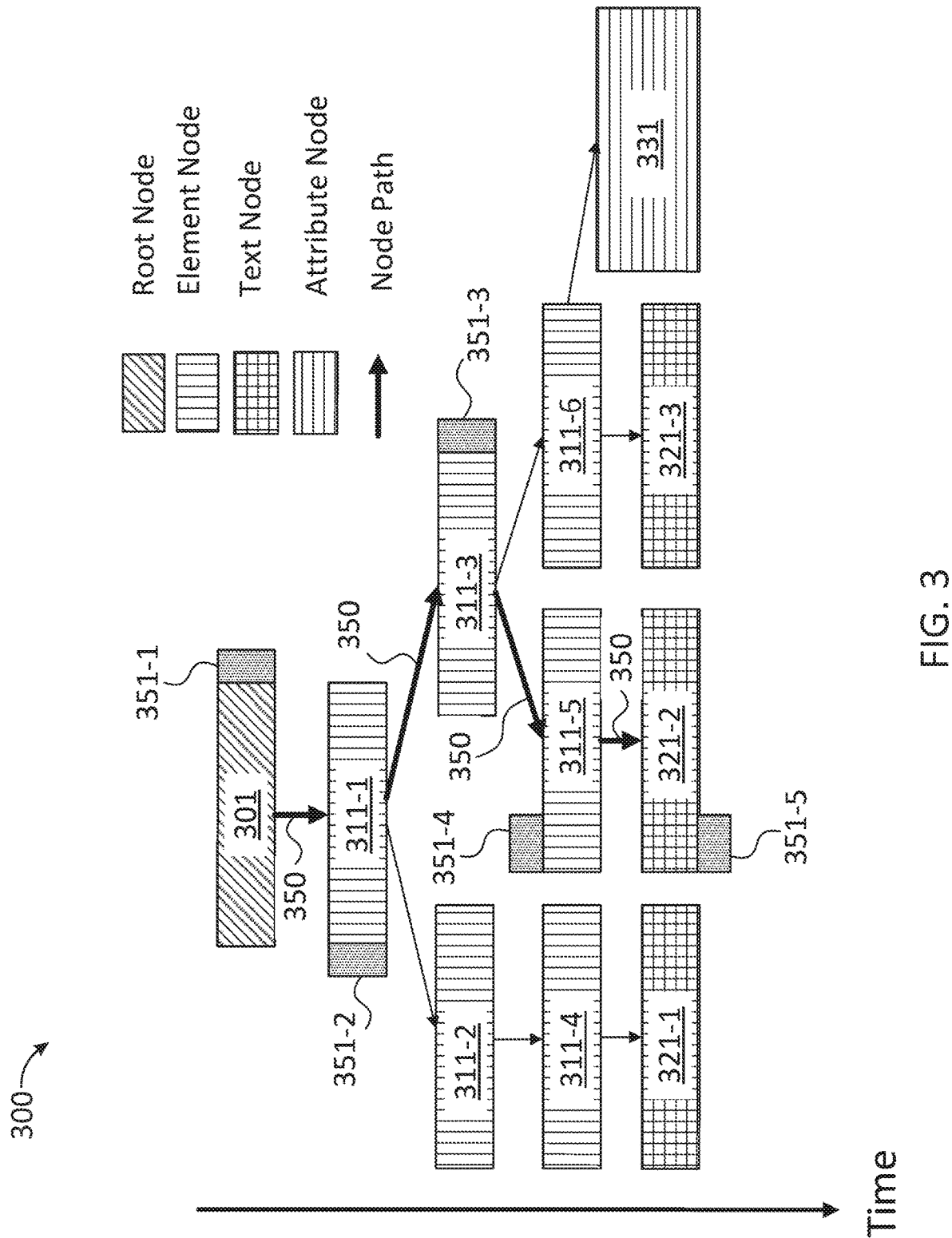
FIG. 3 illustrates a document object model tree including a node path array for recording and playback of a web browser session, according to some embodiments.

FIG. 3 illustrates a DOM tree 300 including a node path 350 for recording and playback of a web browser session, according to some embodiments. DOM tree 300 includes states or nodes starting with a 'root' node 301, and multiple nodes of a variety of types, such as 'element' nodes, 'text' nodes, and 'attribute' nodes. In the illustration, DOM tree 300 includes multiple element nodes 311-1, 311-2, 311-3, 311-4, 311-5, and 311-6 (hereinafter, collectively referred to as "element nodes 311"), text nodes 321-1, 321-2, and 321-3 (hereinafter, collectively referred to as "text nodes" 321), and attribute node 331.

For each event received (e.g., any one of nodes 311, 321, or 331) during recording, node path 350 maps the relationship of the HTML element that emitted the event to the root of the document (e.g., root node 301, the HTML document element). Node path 350 includes an array or sequence of nodes (e.g., root node 301, element nodes 311-1, 311-3, and 311-5, and text node 321-2) that allow a playback code to find the element on the page during playback (e.g., playback code 224). In some embodiments, node path 350 is created by starting at the element or attribute that emitted the event (e.g., text node 321-3) and recording the class name and node type (e.g., 'text') as the final node in node path 350. The parent element in node path 350 (e.g., element 311-5) is also recorded in the playback code, including class name and node type. This process continues until root node 301 is reached.

In addition to class name and node type, node path 350 may also include time-stamps 351-1, 351-2, 351-3, 351-4 and 351-5 (hereinafter, collectively referred to as "time-stamps 351") for each of the nodes in the node path, to log in the time at which the event was entered by the user. In that regard, event recording (e.g., the time interval between time-stamps 351) may be performed "throttled" (e.g., out of sync with the browser application). For example, some browsers emit events 60 times per second or more, while the recording occurs at 10 times per second (e.g., frames per second -fps-). The speed of the recording may be faster or slower, according to providing an acceptable playback experience. Time-stamps 351 ensure that events can be played at the same cadence in which they were received. Using node path 350 attached to each event, DOM tree 300 is walked onward, starting from root node 301 to reproduce the event associated with node 321-2.

In some embodiments, Javascript engines used to record DOM tree 300 in a CSS file (e.g., CSS file 226) may be single threaded and message driven. Accordingly, browser events may be collected on a per "tick" basis, where a tick is an artificial event loop created by the record Javascript. In some embodiments, all browser events fired within an event loop may collected and processed with identical time-stamps 351. Thus, on replay, all events recorded on a single artificial tick, may be fired synchronously. Thus accurately recreating the actual browser experience.

When a browser emits an event for an HTML node (e.g., 331), the browser emits the same event for all parents (311, 311-6, 311-3, 311-1 and 301. The playback code (e.g., playback code 224) receives each event after another (e.g., in a serial script), when the DOM recorder is a Javascript application running within the Javascript engine (e.g., browser engine 240). To accurately recreate the user experience during playback, some embodiments batch these events together into discrete "ticks." For example, when the user hovers the mouse over an HTML element, the browser will fire hover events for the HTML element and all parent elements. While recording the events matching hover selectors from the CSS file, it is desirable to avoid a timestamp difference among the recorded events, to recreate a more realistic user interaction in the playback. Accordingly, in some embodiments a recording tool as disclosed herein creates artificial ticks to set timestamps 351 of events received within the tick with the same timestamp. The recorded events matching events matching hover selectors from the CSS file accurately simulate the user experience during playback, as it was recorded. Thus, the recording does not break when the user makes changes to the recorded web application that are irrelevant to the content of the recording.

Using time-stamps 351, nodes in node path 350 can be serialized when stored in playback code. For example, in some embodiments, node path 350 may include more than one event occurring at about the same time (e.g., element 311-4 together with element 311-3), but stored serially in the playback code. In addition to time-stamps, node path 350 may include custom handlers to handle specific use cases involving CSS selectors, hypertext markup language (HTML) canvas actions, and other edge cases. When all events have been processed to form the playback code, a custom event handler may add custom code before a redux app state is restored to a state prior to the playback start.

To make serializable recordings in a stable manner, some embodiments include finding the smallest number of identifiers for each element node 311 defining a unique node path 350. For example, when node path 350 includes attribute node 331, the "ID" of attribute node 331 is a unique identifier. When no ID is available for the nodes in node path 350, then a class attribute of the node may be used (e.g., 'root,' 'element,' and the like). When no class attributes are available, an HTML tag name may be used, after verifying that no other elements or nodes have the same tag name. When no uniqueness is achieved for node path 350 at any given layer in the hierarchy, the Javascript engine moves up in DOM tree 300 to the parent node in the next level. At the parent node, the Javascript engine checks for ID, if not found, it checks for class, if not found, it uses tag values and verifies uniqueness of parent class/tag and child class/tag combined uniqueness. When successful, then stop and store node path 350. When unsuccessful, the Javascript continues travelling upward along DIM tree 350 to next parent (e.g., back in time towards root node 301. In this manner, the chain of parents/children to find the node we identified while recording is resolved during playback.

In some embodiments, a machine learning algorithm may be trained to give semantic meaning to node path 350. Accordingly, some embodiments as disclosed herein may automatically "track" a DOM node in a similar manner as a human tracks the movement of a feature in a DOM node graph. For example, a human can look at a website and see that the "upload image" button moved from the right side of the screen to the top) even when the DOM node includes different ID/class name.

Figure 4:
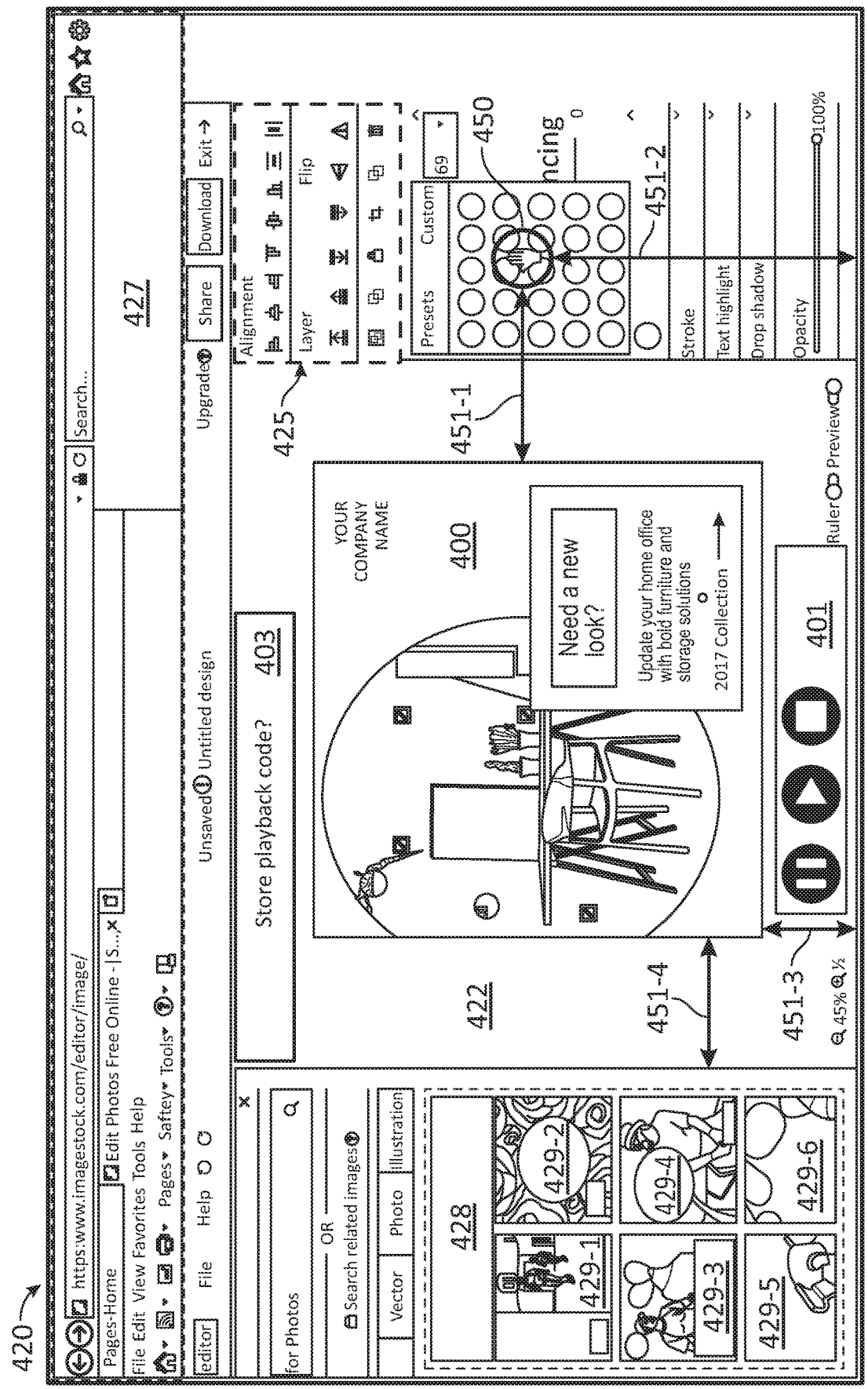
FIG. 4 illustrates a walk-through example of a web browser session being recorded, according to some embodiments.

FIG. 4 illustrates a walk-through example of a web browser session 420 configured for being recorded or played back, according to some embodiments. A network application 422 may be accessed through a browser 427 installed in a client device for the user, and is remotely hosted by a server (e.g., client device 110, application 222, and server 130). In some embodiments, network application 422 allows users to generate images "on the fly" that adhere to a specified set of compositional constraints, and place the images in a canvas 400. In some embodiments, browser 427 may include a "start/stop/pause recording" button 401 and a "store playback code" button 403, consistent with embodiments disclosed herein. Accordingly, the user may press button 401 at any point during session 420 to start recording. The user may pause or stop the recording of session 420 at any time, by pressing button 401 again. In some embodiments, when the user presses stop in button 401, a prompt will ask the user whether the user desires to store a playback code (e.g., playback code 224) with button 403. In some embodiments, when the user presses button 403, the system may display for the user a prompt for a location within the client device or in a remote account (e.g., in server 130 or database 252) where to store the playback code.

Images 429-1, 429-2, 429-3, 429-4, 429-5, and 429-6 (hereinafter, collectively referred to as "images 429") are provided by the search engine accessed through application 422 on a panel 428, from which the user may select one of them to be placed in the respective one of canvas 400. A tool bar 425 enables the user to perform other manipulation of objects within canvas 400. Accordingly, when the user elects to record session 420, pointers and addresses for images 429 are stored in the playback code, so that the images can be recovered and placed in the positions selected by the user during the real-time interaction in session 420.

To account for differences in screen resolutions and window browser size between recording and playback, all coordinates are converted from screen pixels to offset percentages 451-1, 451-2, 451-3, and 451-4 (hereinafter, collectively referred to as "offset percentages 451"). Offset percentages 451 are stored in the playback code. Using offset percentages 451, the playback code accurately reproduces user events stored in a node path (e.g., node path 350) on a pixel resolution that may differ from that of the recording.

When the user presses button 401 for playback, the most recent react-redux state (stored in the playback code) is brought up by browser 427 (e.g., for react-redux configurations). This puts the react-redux app into the same state as when the recording started in session 420. Events in session 420 stored in the playback code are played back in the order in which they were recorded (e.g., the order in which the events were executed during real-time session 420). Using time-stamps of each event (e.g., time-stamps 351), delays are inserted so that the playback speed matches the recording.

During playback, when an element, attribute, or data (e.g., any one of images 429) is not found, then the event in the associated node is ignored and the playback moves on to the next event. In some embodiments, rather than skipping an event for which a certain attribute is missing, corrupted, or not found within a selected time window, a synthetic event is generated to replace the 'missing' node. Accordingly, browser 427 may call and provide the synthetic event to an HTML event handler. The synthetic event may be indistinguishable from a user-generated event during session 420. A javascript code run by browser 427 responds to the synthetic event as if it were a real user-generated event, which gives the user the impression of a seamless playback.

In some embodiments, a synthetic cursor 450 may further increase the immersion of the playback, including synthetic CSS hover effects. As events in the playback code are processed, synthetic cursor 450 is updated to match the location of the cursor on the original recording. Synthetic cursor 450 is placed in the correct location even when browser 427 is a different size or on a different resolution monitor because event coordinates are transformed into offsets 451.

In some embodiments, the playback code may also include a synthetic CSS hover effect. A synthetic CSS hover effect may be obtained by scanning the CSS file for hover effects using text matching. Hover effects are matched against existing HTML elements on the user's web page. As 'enter' and 'leave' events from cursor 450 into and out of different elements (e.g., canvas 400) are processed, attributes associated with these events are checked against the list of elements to which CSS hover effects apply. These elements will then have custom CSS class names applied to them. In some embodiments, CSS hover effects are recreated flawlessly during playback.

In embodiments as disclosed herein, features and characteristics of the web page for application 422 may be re-arranged by analyzing a playback of the user interaction in web browser session 420. For example, tool bar 425 may be re-arranged, or an element in tool bar may be deleted, added, or moved to a different place, based on a user interaction during playback. In some embodiments, the location, size and shape of panel 428 may also be modified based on the playback of web browser session 420. Moreover, in embodiments as disclosed herein, modifications to application 422 may be performed based on playbacks of user interactions for multiple users, using the analysis tool in the server.

Figure 5:
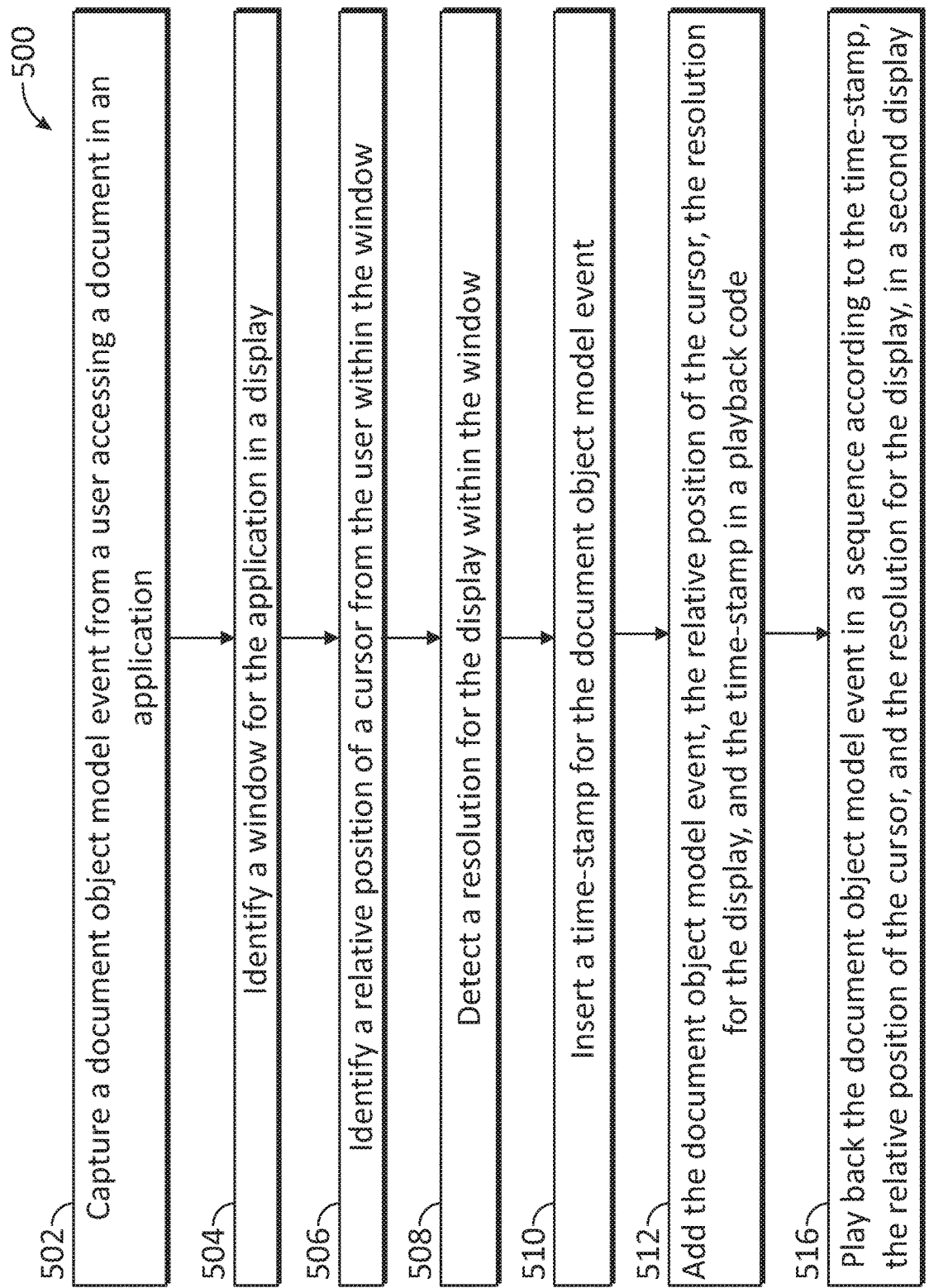
FIG. 5 is a flow chart illustrating steps in a method for recording a web browser session, according to some embodiments.

FIG. 5 is a flow chart illustrating steps in a method 500 for recording a web browser session, according to some embodiments. Method 500 may be performed at least partially by any one of servers hosting a browser application, while communicating with any one of a plurality of client devices (e.g., any one of servers 130 and any one of client devices 110). The client devices may be handled by a user, wherein the user may be registered to a private account with the server, or may be a visitor to the server website or logged in a server application (e.g., applications 222 and 422). At least some of the steps in method 500 may be performed by a computer having a processor executing commands stored in a memory of the computer (e.g., processors 212 and 236 and memories 220 and 232). Further, steps as disclosed in method 500 may include retrieving, editing, and/or storing files in an image database that is part of, or is communicably coupled to, the computer, using, inter alia, a browser engine (e.g., playback database 252 and browser engine 240). The browser engine may include (e.g., recording tool 242, playback tool 244, synthetic CSS tool 246, synthetic event tool 248, and analysis tool 250). Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes capturing a document object model event from a user accessing a document in an application. In some embodiments, step 502 includes receiving an acceptance input from the user before capturing the document object model event. In some embodiments, the application is a browser accessing an internet-based network, and step 502 includes gathering a data accessed by the user with the browser. In some embodiments, the application is a browser accessing an internet-based network, and the step 502 includes retrieving an image accessed by the user with the browser and placing the image within a canvas in the window. In some embodiments, step 502 includes selecting a time interval to capture the document object model event based on a pre-determined frequency.

Step 504 includes identifying a window for the application in a display. For example, in some embodiments step 504 may include identifying a canvas in an image editing application, the canvas including a background image (e.g., canvas 400).

Step 506 includes identifying a relative position of a cursor from the user within the window. For example, in some embodiments step 506 may include identifying a horizontal and vertical relative position of the cursor within the canvas for an image editing application. For example, in some embodiments step 506 may include determining that the cursor is 20% of the width from left-to-right in the canvas, and 40% of the height from bottom to top of the canvas (cf. offset percentages 451-1 and 451-2, respectively).

Step 508 includes detecting a resolution for the display within the window. In some embodiments, step 508 may include determining a number of pixels in the horizontal direction and a number of lines in the vertical direction used by the window.

Step 510 includes inserting a time-stamp for the document object model event. In some embodiments, step 510 includes inserting a time-stamp after a selected number of events have been recorded. Accordingly, in some embodiments step 510 includes inserting time-stamps periodically, while the system records a fixed number of DOM events between each time-stamp.

Step 512 includes adding the document object model event, the relative position of the cursor, the resolution for the display, and the time-stamp in a playback code. In some embodiments, step 512 includes inserting a metadata in the playback code based on the time-stamp and the document object model event, wherein the metadata is indicative of a characteristic of a user session within the application.

Step 514 includes playing back the document object model event in a sequence according to the time-stamp, the relative position of the cursor, and the resolution for the display, in a second display. In some embodiments, step 514 includes playing, at least partially, a tour of the application for a potential user. In some embodiments, step 514 includes testing the application. In some embodiments, step 514 includes evaluating a user-interface interaction based on the playing back the document object model event. In some embodiments, step 514 includes storing the playback code in an executable file and providing the executable file for the user. In some embodiments, step 514 includes inserting a metadata in the playback code based on the time-stamp and the document object model event, wherein the metadata is indicative of a characteristic of a user session within the application.

Figure 6:
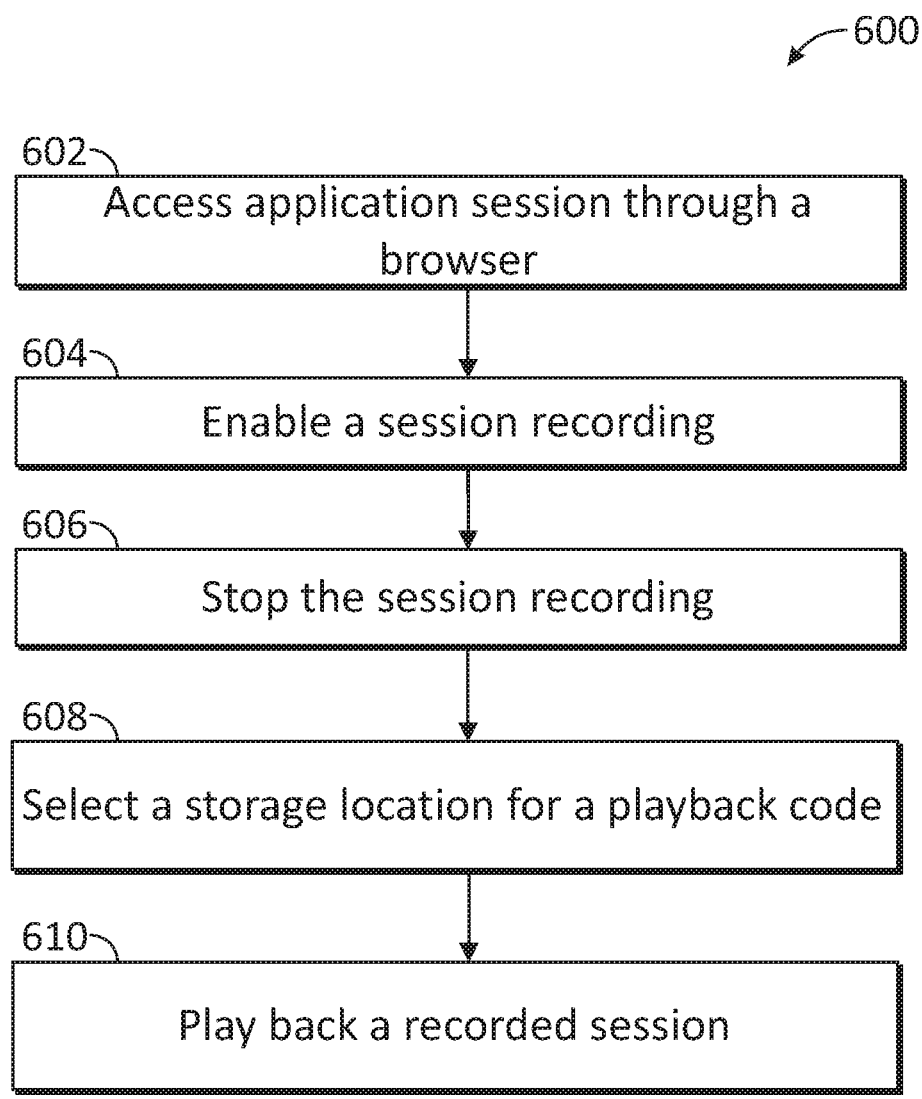
FIG. 6 is a flow chart illustrating steps in a method for recording and playing back a web browser session, according to some embodiments.

FIG. 6 is a flow chart illustrating steps in a method 600 for recording and playing back a web browser session, according to some embodiments. Method 600 may be performed at least partially by any one of servers hosting a browser application, while communicating with any one of a plurality of client devices (e.g., any one of servers 130 and any one of client devices 110). The client devices may be handled by a user, wherein the user may be registered to a private account with the server, or may be a visitor to the server website or logged in a server application (e.g., applications 222 and 422) accessible through a browser. At least some of the steps in method 600 may be performed by a computer having a processor executing commands stored in a memory of the computer (e.g., processors 212 and 236 and memories 220 and 232). Further, steps as disclosed in method 600 may include retrieving, editing, and/or storing files in an image database that is part of, or is communicably coupled to, the computer, using, inter alia, a browser engine (e.g., playback database 252 and browser engine 240). The browser engine may include (e.g., recording tool 242, playback tool 244, synthetic CSS tool 246, synthetic event tool 248, and analysis tool 250), and host a browser application in the client device. Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes accessing an application session through the browser application. In some embodiments, step 602 includes opening a web browser session with the browser from a client device.

Step 604 includes enabling a session recording. In some embodiments, step 604 includes activating a "start" button in a web page of the application accessed through the browser. In some embodiments, the user may perform step 604 at any point during the web browser session.

Step 606 includes stopping the session recording. In some embodiments, step 604 includes activating a "stop" button in the web page of the application accessed through the browser.

Step 608 includes selecting a storage location for a playback code. In some embodiments, step 608 may include selecting a local storage location in the client device. In some embodiments, step 608 may include selecting a remote storage location in the database or in the server, for storing the playback code.

Step 610 includes playing back a recorded session. In some embodiments, step 610 includes activating a "play" button in the web page of the application accessed through the browser.

Figure 7:
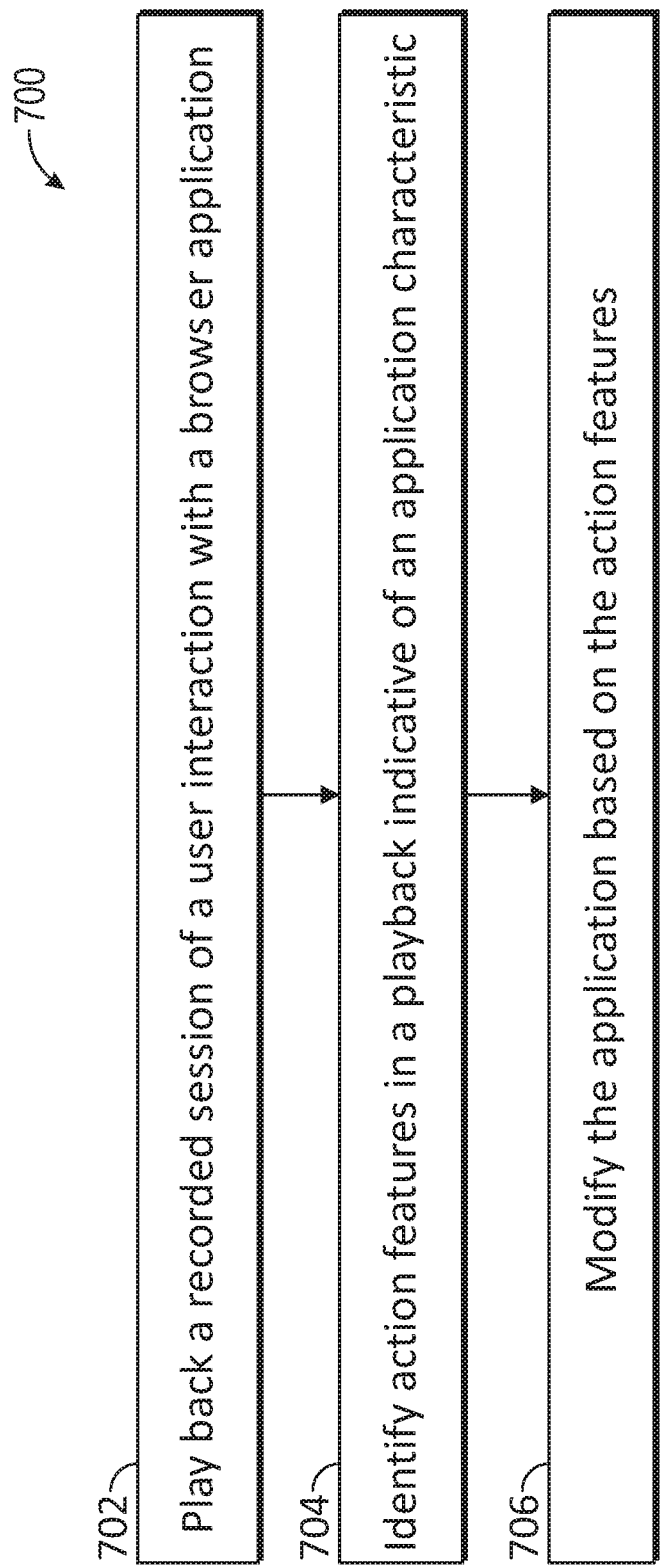
FIG. 7 is a flow chart illustrating steps in a method for using a playback of a web browser session to modify an application, according to some embodiments.

FIG. 7 is a flow chart illustrating steps in a method 700 for using a playback of a web browser session to modify an application, according to some embodiments. Method 700 may be performed at least partially by any one of servers hosting a browser application, while communicating with any one of a plurality of client devices (e.g., any one of servers 130 and any one of client devices 110). The client devices may be handled by a user, wherein the user may be registered to a private account with the server, or may be a visitor to the server website or logged in a server application (e.g., applications 222 and 422). At least some of the steps in method 700 may be performed by a computer having a processor executing commands stored in a memory of the computer (e.g., processors 212 and 236 and memories 220 and 232). Further, steps as disclosed in method 700 may include retrieving, editing, and/or storing files in an image database that is part of, or is communicably coupled to, the computer, using, inter alia, a browser engine (e.g., playback database 252 and browser engine 240). The browser engine may include (e.g., recording tool 242, playback tool 244, synthetic CSS tool 246, synthetic event tool 248, and analysis tool 250). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes playing back a recorded session of a user interaction with a browser application. In some embodiments, step 702 includes creating selectors to resolve specific DOM elements that emitted the events in the node path. In some embodiments, step 702 includes simulating user actions occurring on the webpage even in a new session of the application.

Step 704 includes identifying action features in the playback, indicative of an application characteristic. In some embodiments, step 704 may include identifying a defect in an editing tool provided in the application by identifying a frustrated response of the user to an attempt to activate the editing tool. In some embodiments, the application characteristic may include a misplaced feature in the web page of the application, and step 704 may include identifying the misplaced feature by recognizing a repeated mistake by the user in attempts to access the feature.

Step 706 includes modifying the application based on the action features. In some embodiments, step 706 may include modifying the editing tool to avoid or reduce the user frustration. In some embodiments, step 706 may include re-arranging features in the web page for the application, to reduce the user frustration.

Hardware Overview

Figure 8:
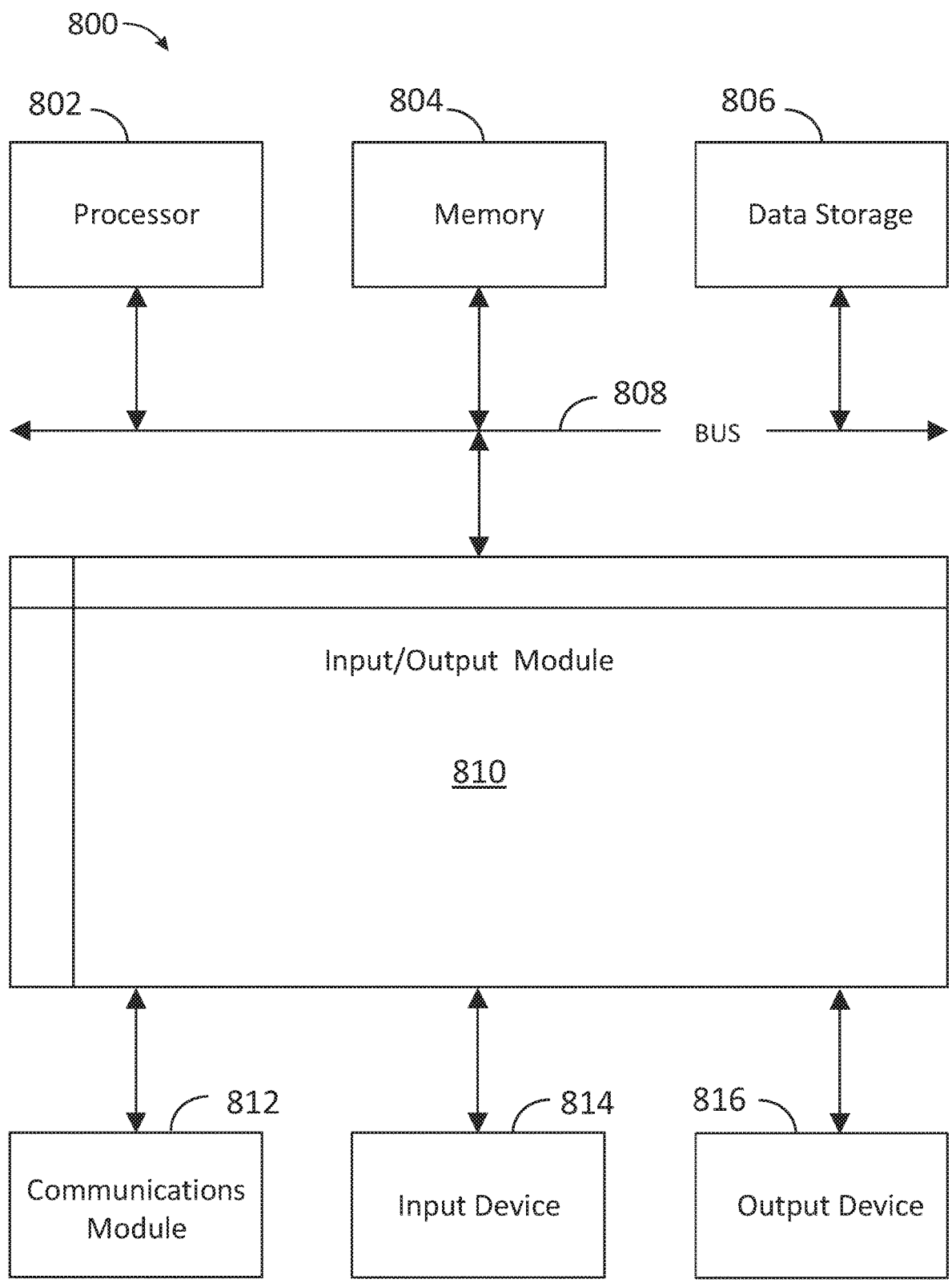
FIG. 8 is a block diagram illustrating an example computer system with which the client and server of FIGS. 1 and 2 and the methods of FIGS. 5-7 can be implemented.

FIG. 8 is a block diagram illustrating an exemplary computer system 800 with which the client 110 and server 130 of FIGS. 1 and 2, and the methods of FIGS. 5-7 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk, an optical disk, or a solid state drive (SSD) coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   capturing a document object model event from a user accessing a document in an application;
   identifying a window for the application in a display;
   identifying a relative position of a cursor from the user within the window;
   detecting a resolution for the display within the window;
   inserting a time-stamp for the document object model event according to a time interval that captures the document object model event at a pre-determined frequency;
   adding the document object model event, the relative position of the cursor, the resolution for the display, and the time-stamp in a playback code;
   finding the smallest number of identifiers for each event to define a unique node path that comprises multiple sequential events having a common parent event and a common identifier including a class name and a node type; and
   playing back the document object model event in a sequence according to the time-stamp, the relative position of the cursor, and the resolution for the display, in a second display, wherein inserting the time-stamp for the document object model event comprises creating an artificial tick to set multiple events within the artificial tick with a same time-stamp.

2. The computer-implemented method of claim 1, further comprising receiving an acceptance input from the user before capturing the document object model event.

3. The computer-implemented method of claim 1, wherein the application is a browser accessing an internet-based network, and the computer-implemented method further comprises gathering a data accessed by the user with the browser.

4. The computer-implemented method of claim 1, wherein the application is a browser accessing an internet-based network, and the computer-implemented method further comprises retrieving an image accessed by the user with the browser and placing the image within a canvas in the window.

5. The computer-implemented method of claim 1, further comprising inserting a metadata in the playback code based on the time-stamp and the document object model event, wherein the metadata is indicative of a characteristic of a user session within the application.

6. The computer-implemented method of claim 1, wherein playing back the document object model event comprises playing, at least partially, a tour of the application for a potential user.

7. The computer-implemented method of claim 1, wherein playing back the document comprises testing the application.

8. The computer-implemented method of claim 1, further comprising evaluating a user-interface interaction based on the playing back the document object model event.

9. The computer-implemented method of claim 1, further comprising storing the playback code in an executable file and providing the executable file for the user.

10. The computer-implemented method of claim 1, wherein playing back the document object model event comprises delaying the document object model event based on the time-stamp and a second time-stamp for a second document object model event.

11. The computer-implemented method of claim 1, further comprising creating a fake document object model event interpolated between a first document object model event and a second document object model event.

12. The computer-implemented method of claim 1, further comprising restoring the application to an original state after playing back the document object model event.

13. A system, comprising:
one or more processors; and
a memory coupled to the one or more processors, the memory including instructions that, when executed by the one or more processors, cause the system to:
capture a document object model event from a user accessing a document in an application;
identify a window for the application in a display;
identify a relative position of a cursor from the user within the window;
detect a resolution for the display within the window;
insert a time-stamp for the document object model event according to a time interval that captures the document object model event at a pre-determined frequency;
include the document object model event, the relative position of the cursor, the resolution for the display, and the time-stamp in a playback code;
find a smallest number of identifiers for each event to define a unique node path that comprises multiple sequential events having a common parent event and a common identifier including a class name and a node type; and
play back the document object model event in a sequence according to the time-stamp, the relative position of the cursor, and the resolution for the display, in a second display, wherein to insert the time-stamp for the document object model event the one or more processors execute instructions to create an artificial tick to set multiple events within the artificial tick with the same time-stamp.

14. The system of claim 13, wherein the application is a browser accessing an internet-based network, and the one or more processors further execute instructions to retrieve an image accessed by the user with the browser and placing the image within a canvas in the window.

15. The system of claim 13, wherein to play back the document object model event the one or more processors further execute instructions to delay the document object model event based on the time-stamp and a second time-stamp for a second document object model event.

16. A non-transitory, computer-readable medium storing instructions which, when executed by a processor, cause a computer to perform a method, the method comprising:
capturing a document object model event from a user accessing a document in an application;
identifying a window for the application in a display;
identifying a relative position of a cursor from the user within the window;
detecting a resolution for the display within the window;
inserting a time-stamp for the document object model event according to a time interval that captures the document object model event at a pre-determined frequency;
including the document object model event, the relative position of the cursor, the resolution for the display, and the time-stamp in a playback code;
finding a smallest number of identifiers for each event to define a unique node path that comprises multiple sequential events having a common parent event and a common identifier including a class name and a node type; and
playing back the document object model event in a sequence according to the time-stamp, the relative position of the cursor, and the resolution for the display, in a second display wherein inserting the time-stamp for the document object model event comprises creating an artificial tick to set multiple events within the artificial tick with a same time-stamp.

17. The non-transitory, computer-readable medium of claim 16, wherein the application is a browser accessing an internet-based network, and the method further comprises retrieving an image accessed by the user with the browser and placing the image within a canvas in the window.

* * * * *